(12) United States Patent
Peng et al.

(10) Patent No.: US 7,152,873 B2
(45) Date of Patent: Dec. 26, 2006

(54) OVERHEAD AUTOMOTIVE AIRBAG DESIGN

(75) Inventors: James Peng, Ypsilanti, MI (US); Thiag Subbian, Farmington Hills, MI (US); Kurt Ewing, Canton, MI (US); BeiBei Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 10/709,731

(22) Filed: May 25, 2004

(65) Prior Publication Data

US 2005/0275198 A1 Dec. 15, 2005

(51) Int. Cl.
*B60R 21/16* (2006.01)

(52) U.S. Cl. .................................. 280/730.1
(58) Field of Classification Search ............. 280/730.1, 280/730.2, 728.2
See application file for complete search history.

(56) References Cited

U.S. PATENT DOCUMENTS

| 6,234,517 | B1 | 5/2001 | Miyahara et al. | |
|---|---|---|---|---|
| 6,467,563 | B1 | 10/2002 | Ryan et al. | |
| 6,932,380 | B1 * | 8/2005 | Choi | 280/730.1 |
| 2001/0028161 | A1 | 10/2001 | Hoagland | |
| 2001/0040364 | A1 | 11/2001 | Viano et al. | |
| 2002/0089152 | A1 | 7/2002 | Khoudari et al. | |
| 2003/0052476 | A1 | 3/2003 | Rose | |

* cited by examiner

*Primary Examiner*—Faye M. Fleming
(74) *Attorney, Agent, or Firm*—Frank A. MacKenzie; Artz & Artz, P.C.

(57) ABSTRACT

An automotive overhead airbag assembly is provided including an airbag mounted on an inside surface of a vehicle roof at an airbag mount position. The airbag has an airbag stored condition and an airbag deployed position and expands downwards from said vehicle roof when in the airbag deployed position. The assembly includes at least one wing element having a first wing mounting edge mounted to the vehicle roof and a second wing mounting edge mounted to a lower deployed portion of said airbag. The first wing mounting edge extends in a transverse direction from the airbag mount position. The at least one wing element includes a wing stored condition and a wing deployed position. The at least one wing element restricts forward motion of the airbag when the airbag is in the deployed position. The assembly includes a trampoline surface formed by the at least one wing element when the at least one wing element is in said wing deployed position. The trampoline surface absorbs passenger forward momentum during vehicle impact.

20 Claims, 2 Drawing Sheets

OVERHEAD AUTOMOTIVE AIRBAG DESIGN

BACKGROUND OF INVENTION

The present invention relates generally to an overhead automotive airbag assembly and more particularly to an overhead airbag assembly with limited forward movement.

Automotive vehicle design is governed by the constant and unending pursuit of improved occupant comfort and safety. Modern vehicles incorporate considerable design and manufacturing efforts to minimize injuries to occupants in the event of vehicle accidents. These safety features, however, must co-exist with the primary functional features as well as the comfort features of the vehicle. Their placement within the vehicle, therefore, must be a function of both operation of the safety component in combination with available placement within the existing vehicle operational structure.

These physical placement constraints can serve to limit the freedom of placement of certain features within the automobile. Such is the case with airbag assemblies. Airbag assemblies have proven themselves to be highly beneficial and desirable to consumers. A wide variety of implementation schemes have been devised in order to improve the functionality of airbag protection assemblies. The assemblies, however, are often positioned within traditional mounting structures based upon their operational objectives. Frontal impact airbags, for instance, are commonly positioned immediately forward of the occupant and are designed to inflate towards the occupant upon vehicle impact. This requires installation immediately forward of the occupant in the steering wheel or dashboard. Placement of frontal impact airbags for rear-seated passengers is often impractical or overly complex.

The resulting design scenario commonly finds these airbag assemblies positioned in these traditional mounting locations. These locations, especially the dashboard, can become prized real estate in automotive design. As additional technology and features are incorporated into automobiles, locations such as the dashboard are desirable for passenger accessible features. Present airbag assemblies can place considerable constraint on the incorporation of these new features. It would therefore, be highly desirable to afford an alternate mounting location for forward impact airbag assemblies that provided design flexibility to automotive designers such that that airbag assemblies did not place unreasonable constraints on design creativity.

On approach to the placement of frontal impact airbag assemblies is to position the assemblies in an overhead position. This arrangement not only addresses the concern for useful real estate on the dashboard, but also can provide access to passengers seated in the rear without complex seat/airbag designs. The nature of present airbag assemblies, however, does not provide adequate restraint in directions perpendicular to inflation. An overhead airbag assembly, therefore, would provide insufficient resistance to forward motion since the passenger is moving in a direction perpendicular to inflation. The lack of forward motion resistance is further exacerbated by the relatively small airbag mounting arrangements. The mounting structures are commonly small compared to the inflated bags and therefore provide inadequate support for the resistance of perpendicular forces. It would, therefore, be highly desirable to have an overhead airbag assembly design with improved forward motion resistance.

SUMMARY OF INVENTION

It is, therefore, an object of the present invention to provide an automotive overhead airbag assembly with forward motion resistance. It is a further object of the present invention to provide an automotive overhead airbag assembly with improved overhead installation characteristics.

In accordance with the objects of the present invention, an automotive overhead airbag assembly is provided. The automotive overhead airbag assembly includes an airbag mounted on an inside surface of a vehicle roof at an airbag mount position. The airbag has an airbag stored condition and an airbag deployed position and expands downwards from said vehicle roof when in the airbag deployed position. The assembly includes at least one wing element having a first wing mounting edge mounted to the vehicle roof and a second wing mounting edge mounted to a lower deployed portion of said airbag. The first wing mounting edge extends in a transverse direction from the airbag mount position. The at least one wing element includes a wing stored condition and a wing deployed position. The at least one wing element restricts forward motion of the airbag when the airbag is in the deployed position. The assembly includes a trampoline surface formed by the at least one wing element when the at least one wing element is in said wing deployed position. The trampoline surface absorbs passenger forward momentum during vehicle impact.

Other objects and features of the present invention will become apparent when viewed in light of the detailed description of the preferred embodiment when taken in conjunction with the attached drawings and appended claims.

DETAILED DESCRIPTION

Figure 1:
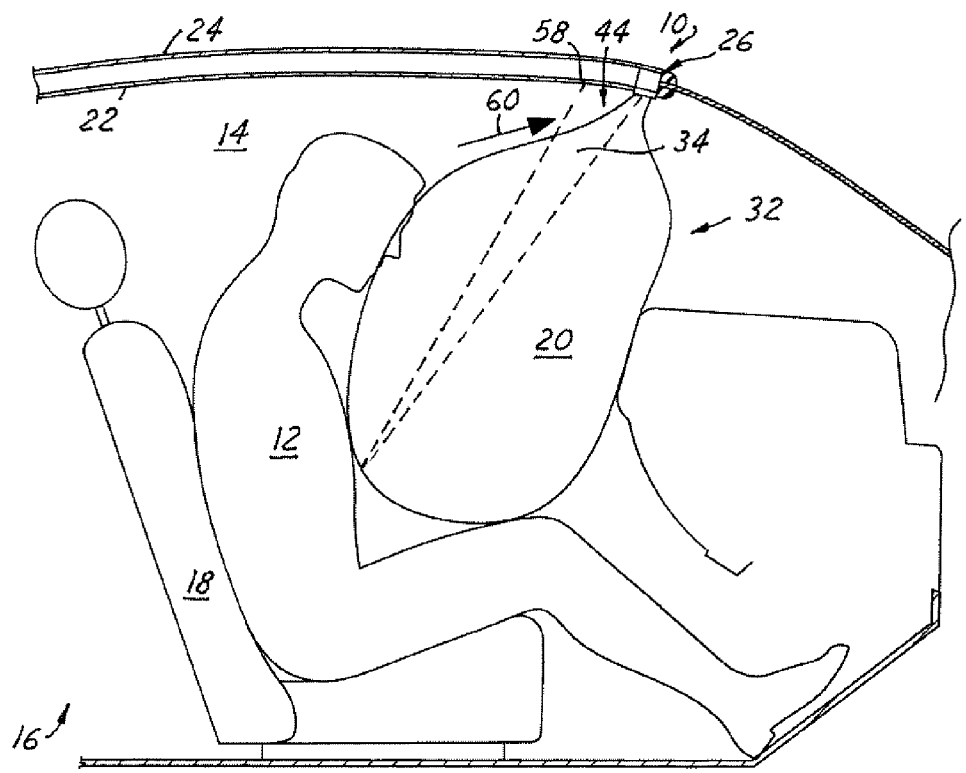
FIG. 1 is a side-view illustration of an overhead airbag assembly in accordance with the present invention, the assembly illustrated in the airbag deployed position.

Referring now to FIG. 1, which is an illustration of an automotive overhead airbag assembly 10 in accordance with the present invention. The overhead airbag assembly 10 is intended to be utilized in a wide variety of vehicles for a wide variety of specific configurations. It is intended, however, to provide overhead deployed airbag protection to an occupant 12 positioned within the interior 14 of a vehicle 16, such as within a vehicle seat 18. The present invention provides such protection in addition to increasing airbag engagement area and reducing forward motion.

Figure 2:
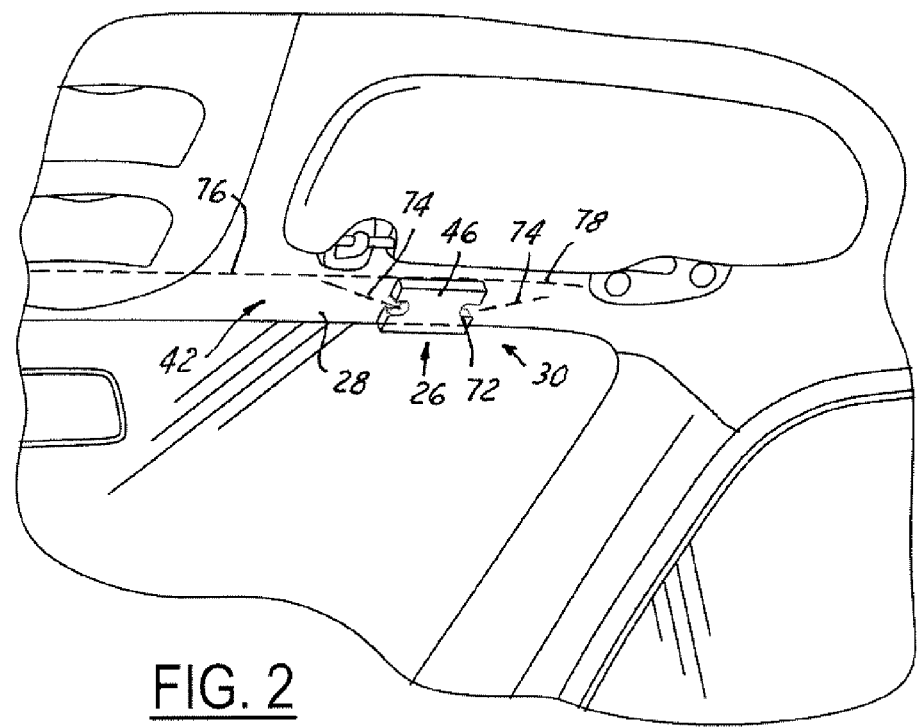
FIG. 2 is a detail illustration of the overhead airbag assembly, the overhead airbag assembly illustrated in the airbag stored position.

The present invention accomplishes these goals by including an airbag 20 mounted on an inside surface 22 of the vehicle roof 24 at an airbag mount position 26. Although a variety of airbag mount positions 26 on the vehicle roof 24 are contemplated and may be optimized for specific applications, one embodiment contemplates the placement of the airbag mount position 26 on the vehicle roof rail 28 (see FIG. 2). The airbag 20 has an airbag stored condition 30 (FIG. 2) and an airbag deployed position (FIG. 1) 32. The airbag 20 expands downward from the vehicle roof 24 to move from the airbag stored condition 30 to the airbag deployed position 32.

Figure 3:
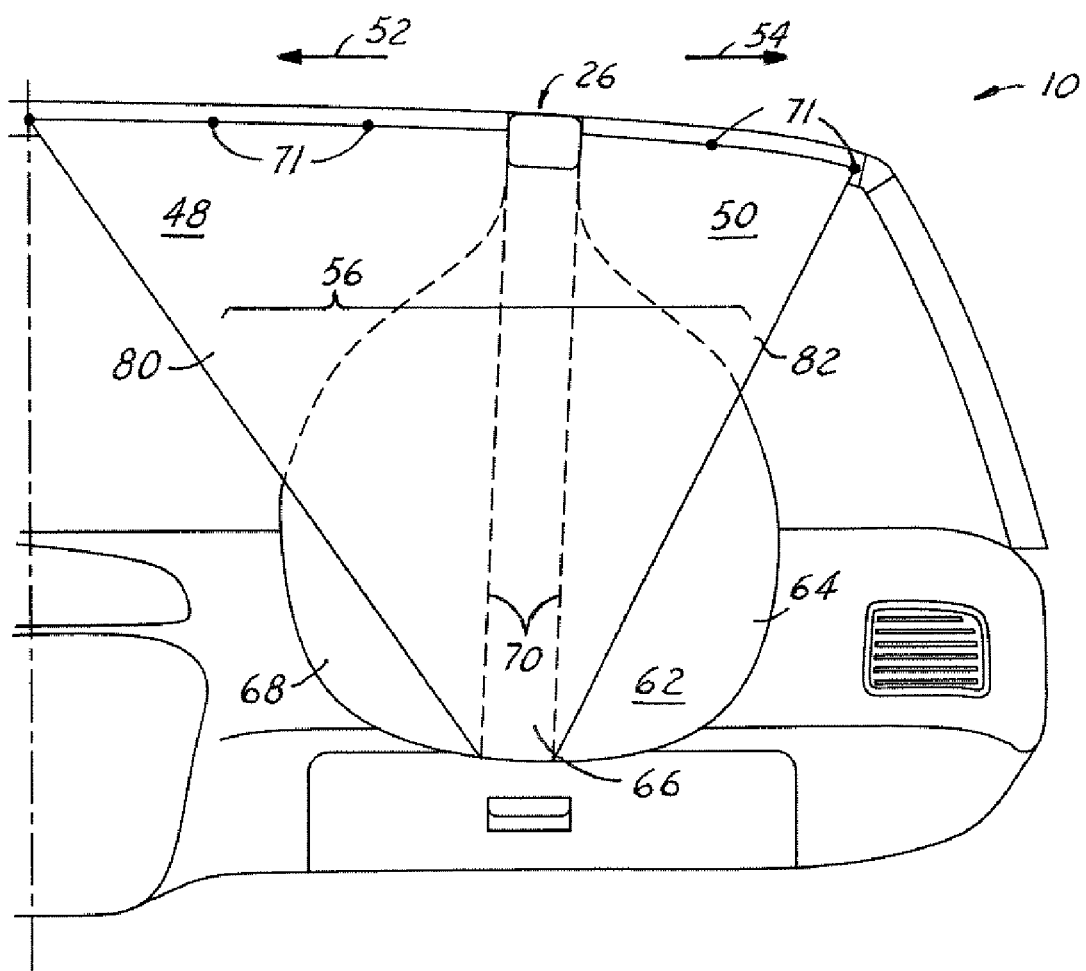
FIG. 3 is a rear view illustration of the overhead airbag assembly illustrated in FIG. 1, the view illustrating the assembly wing elements.

The present invention improves the performance of the airbag 20 by including at least one wing element 34 having an upper wing mounting edge 36 mounted to the vehicle roof 24 and a side wing mounting edge 38 mounted to a lower deployed portion 40 of the airbag 20. The at least one wing element 34 has a wing stored condition 42 (FIG. 2) and a wing deployed position 44 (FIG. 1). The at least one wing element 34 is utilized to restrict forward motion of the airbag 20 when the airbag 20 is in the airbag deployed position 32. This is important since the airbag module 46 is commonly relatively small in size compared to the deployed airbag 20 and therefore does not alone supply sufficient passenger forward momentum 60 restraint. It is contemplated that the at least one wing element 34 can be formed in a variety of fashions. It may be formed as a triangular wing element as illustrated in FIG. 3. It may be further comprised of a first wing element 48 and a second wing element 50. The first wing element 48 extends in a first transverse direction 52 from the airbag mount position 26. The second wing element 50 extends in a second transverse direction 54 from the airbag mount position 26. By extending the wing elements 48,50 in generally opposing transverse directions 52,54 an extended passenger engagement surface 56 is generated. The extended passenger engagement surface 56 extends the practical airbag 20 surface area. In addition, it acts as a trampoline surface to further absorb passenger momentum. These characteristics are further improved through the introduction of a rearward mounting point 58, rearward of the airbag mount position 26, even with generally opposing transverse directions 52,54.

The wing elements 48, 50 are attached to the airbag 20 preferably by way of the side wing mounting edge 38 which is vertically mounted to the airbag 20. The side wing mounting edge 38 may be attached to the airbag 20 in a variety of fashions, although stitching the side wing mounting edge 38 to the inner surface 62 of the airbag 20 is preferred. The airbag 20 can be divided into three vertical sections, a right vertical section 64, a center vertical section 66, and a left vertical section 68. The wing elements 48, 50 are preferably mounted to opposing edges 70 of the center vertical section 66. This optimizes the fore/aft restraint generated by the wing elements 48,50. The right vertical section 64 and left vertical section 68 can be folded over the center vertical section for installation into the airbag module 46. Although the wing elements 48,50 can be mounted to the vehicle roof 24 all along the upper wing mounting edge 36, it is contemplated that they may be physically attached in a plurality of mounting locations 71 to simplify assembly while providing sufficient support.

The airbag 20, when in the airbag stored condition 30, is stored within an airbag module 46 mounted to the roof rail 28. A slotted guide 72, or pair of slotted guides, formed in the airbag module 46 allows the wing elements 48,50 to extend from the airbag module 46 in the transverse directions 52,54 for mounting to the vehicle roof 24 even while the airbag 20 is in the airbag stored condition 30. The first wing element 48 and second wing element 50 can be stored within a slotted chamber 74 formed in the vehicle roof 24, such as in the headliner, such that they are hidden from view while in their respective first wing stored condition 76 and second wing stored condition 78. Upon inflation of the airbag 20, the first and second wing elements 48,50 are pulled downward into a first wing deployed position 80 and second wing deployed position 82 (see FIG. 2). The material of the wing elements 48,50 is thereby stretched to form a trampoline surface 56 that, as trampolines do, absorbs momentum efficiently.

While particular embodiments of the invention have been shown and described, numerous variations and alternative embodiments will occur to those skilled in the art. Accordingly, it is intended that the invention be limited only in terms of the appended claims.

The invention claimed is:

1. An automotive overhead airbag assembly comprising:
   an airbag mounted on an inside surface of a vehicle roof at an airbag mount position, said airbag having an airbag stored condition and an airbag deployed position, said airbag expanding downwards from said vehicle roof when in said airbag deployed position;
   at least one wing element having a upper wing mounting edge mounted to said vehicle roof and a side wing mounting edge mounted to a lower deployed portion of said airbag, said upper wing mounting edge extending in a transverse direction from said airbag mount position, said at least one wing element having a wing stored condition and a wing deployed position, said at least one wing element restricting forward motion of said airbag when said airbag is in said deployed position; and
   a trampoline surface formed by said at least one wing element when said at least one wing element is in said wing deployed position, said trampoline surface facing and absorbing passenger forward momentum during vehicle impact.

2. An automotive overhead airbag assembly as described in claim 1, wherein said at least one wing element comprises:
   a first wing element extending in a first transverse direction outward from said airbag mount position; and
   a second wing element extending in a second transverse direction outward from said airbag mount position.

3. An automotive overhead airbag assembly as described in claim 2, wherein said first wing element and said second wing element comprise triangular wing elements.

4. An automotive overhead airbag assembly as described in claim 1, further comprising:
   an airbag module storing said airbag when said airbag is in said airbag stored position, said airbag module having at least one slotted guide positioned on a transverse side, said at least one slotted guide permitting said at least one wing element to extend in said transverse direction while said airbag is in said airbag stored position.

5. An automotive auxiliary restraint assembly as described in claim 1, further comprising:
   a slotted chamber positioned on said vehicle roof, said slotted chamber extending in a transverse direction from said airbag module, said at least one wing element stored in said slotted chamber when said airbag is in said airbag stored position.

6. An automotive auxiliary restraint assembly as described in claim 1, wherein said side wing mounting edge is vertically mounted to said airbag.

7. An automotive auxiliary restraint assembly as described in claim 1, wherein said side wing mounting edge is stitched on an inner surface of said airbag.

8. An automotive auxiliary restraint assembly as described in claim 2, wherein said airbag comprises a vertically orientated center portion, said first wing element and said second wing element mounted to opposing edges of said vertically orientated center portion such that said trampoline is comprised of said first wing element, said second wing element, and said vertically orientated center portion.

9. An automotive auxiliary restraint assembly as described in claim 1, wherein said trampoline comprises said at least one wing element stretched to resist forward motion of said airbag.

10. An automotive auxiliary restraint assembly as described in claim 1, wherein said airbag is mounted to a roof rail.

11. An automotive overhead airbag assembly comprising:
an airbag mounted on an inside surface of a vehicle roof at an airbag mount position, said airbag having an airbag stored condition and an airbag deployed position, said airbag expanding downwards from said vehicle roof when in said airbag deployed position;
a first wing element having a first upper wing mounting edge mounted to said vehicle roof and a first side wing mounting edge mounted to a lower deployed portion of said airbag, said first upper wing mounting edge extending in a first transverse direction from said airbag mount position, said first wing element having a first wing stored condition and a first wing deployed position;
a second wing element having a second upper wing mounting edge mounted to said vehicle roof and a second side wing mounting edge mounted to said lower deployed portion of said airbag, said second upper wing mounting edge extending in a second transverse direction from said airbag mount position, said second wing element having a second wing stored condition and a second wing deployed position;
said first wing element restricting forward motion of said airbag when said airbag is in said deployed position; and
a trampoline surface formed by said first wing element and said second wing element when said airbag is in said airbag deployed position, said trampoline surface restricting forward motion of said airbag, said trampoline surface absorbing passenger forward momentum during vehicle impact.

12. An automotive overhead airbag assembly as described in claim 11, wherein said first wing element and said second wing element comprise triangular wing elements.

13. An automotive overhead airbag assembly as described in claim 11, further comprising:
an airbag module housing said airbag when said airbag is in said airbag stored position, said airbag module having a first slotted guide and a second slotted guide positioned on opposing transverse sides of said airbag module, said first and second slotted guides permitting said first and second wing elements to extend in opposing transverse directions from said airbag module while said airbag is in said airbag stored position.

14. An automotive auxiliary restraint assembly as described in claim 11, wherein said first wing element and said second wing element are stretched to resist forward motion of said airbag trampoline when said airbag is in said airbag deployed position.

15. An automotive auxiliary restraint assembly as described in claim 11, wherein said first side wing mounting edge and said second side wing mounting edge are vertically mounted to said airbag.

16. An automotive auxiliary restraint assembly as described in claim 11, wherein said airbag is mounted to a roof rail.

17. A method of restraining passenger forward momentum during a vehicular impact comprising:
storing an airbag within an airbag module, said airbag module positioned on a vehicle roof, said airbag having an airbag stored condition and an airbag deployed position;
deploying said airbag downwards into said airbag deployed position during the vehicular impact;
simultaneously deploying at least one wing element having a upper wing mounting edge mounted to said vehicle roof and a side wing mounting edge mounted to a lower deployed portion of said airbag, said upper wing mounting edge extending in a transverse direction from said airbag mount position, said at least one wing element restricting forward motion of said airbag when said airbag is in said deployed position;
engaging the passenger using a trampoline surface formed by said at least one wing element when said airbag is in said airbag deployed position, said trampoline surface absorbing passenger forward momentum during vehicle impact.

18. A method as described in claim 17, further comprising:
storing said at least one wing element a slotted chamber positioned on said vehicle roof, said slotted chamber extending in a transverse direction from said airbag module, said at least one wing element stored in said slotted chamber when said airbag is in said airbag stored position; and
routing said at least one wing element through at least one slotted guide positioned on a transverse side of said airbag module, said at least one slotted guide permitting said at least one wing element to extend in said transverse direction while said airbag is in said airbag stored position.

19. A method as described in claim 17, wherein said at least one wing element comprises a first wing element and a second wing element, further comprising:
folding a vertically orientated right portion and a vertically orientated left portion of said airbag over a vertically orientated center portion;
positioning said airbag within said airbag module such that said first wing element extends in a first transverse direction outwards from said airbag module through a first slotted chamber and said second wing element extends in a second transverse direction outwards from said airbag module through a second slotted chamber.

20. A method as described in claim 19, further comprising:
exerting tension in said at least one wing element by deploying said airbag; and
generating an extended passenger engagement surface comprising said at least one wing element and said airbag when said airbag is in said airbag deployed position.

* * * * *